US007938493B2

(12) United States Patent
Miyazaki

(10) Patent No.: US 7,938,493 B2
(45) Date of Patent: May 10, 2011

(54) BRAKE CONTROL SYSTEM AND BRAKE CONTROL METHOD

(75) Inventor: Tetsuya Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/864,247

(22) PCT Filed: Feb. 9, 2009

(86) PCT No.: PCT/IB2009/000221
§ 371 (c)(1),
(2), (4) Date: Jul. 23, 2010

(87) PCT Pub. No.: WO2009/101499
PCT Pub. Date: Aug. 20, 2009

(65) Prior Publication Data
US 2010/0295363 A1   Nov. 25, 2010

(30) Foreign Application Priority Data

Feb. 12, 2008 (JP) .................................. 2008-031064

(51) Int. Cl.
*B60T 13/18* (2006.01)
(52) U.S. Cl. ........................................ 303/11; 303/116.2
(58) Field of Classification Search .................... 303/10, 303/11, 155, 116.1–116.2
See application file for complete search history.

(56) References Cited

U.S. PATENT DOCUMENTS

| 4,927,213 A | 5/1990 | Burgdore |
| 5,048,899 A | 9/1991 | Schmitt et al. |
| 5,738,420 A | 4/1998 | Kawaguchi et al. |
| 6,715,846 B1 | 4/2004 | Pueschel et al. |
| 6,851,760 B2 * | 2/2005 | Ishida et al. ............... 303/11 |
| 7,530,649 B2 * | 5/2009 | Kusano ..................... 303/151 |
| 2004/0135426 A1 * | 7/2004 | Yogo et al. ................. 303/11 |
| 2005/0012391 A1 * | 1/2005 | Kato et al. ................. 303/155 |

(Continued)

FOREIGN PATENT DOCUMENTS

EP   1 808 347 A1   7/2007

(Continued)

OTHER PUBLICATIONS

Japanese Office Action issued in Japanese Patent Application No. 2008-031064 on Sep. 14, 2010 (with translation).

(Continued)

*Primary Examiner* — Christopher P Schwartz
(74) *Attorney, Agent, or Firm* — Oliff & Berridge, PLC

(57) ABSTRACT

A brake control system includes a wheel cylinder, a brake pedal, a master cylinder in which communication between it and an external master cylinder reservoir is cut off when the operating amount of the brake pedal is equal to or greater than a predetermined value, an internal reservoir, and a pump which selectively discharges hydraulic fluid in two directions, one being a direction that increases the hydraulic pressure in the wheel cylinder by drawing up hydraulic fluid from the internal reservoir, and the other being a direction that stores hydraulic fluid in the internal reservoir. The pump is driven to discharge hydraulic fluid in the direction that stores hydraulic fluid when communication is open between the master cylinder and the master cylinder reservoir, and driven to discharge hydraulic fluid in the direction that increases the hydraulic pressure when communication is cut off between the master cylinder and the master cylinder reservoir. A further invention is directed to a brake control method.

13 Claims, 4 Drawing Sheets

U.S. PATENT DOCUMENTS

| | | | |
|---|---|---|---|
| 2005/0057096 A1* | 3/2005 | Kudo | 303/155 |
| 2006/0055232 A1* | 3/2006 | Koyama | 303/10 |
| 2006/0082217 A1* | 4/2006 | Hatano et al. | 303/122 |
| 2006/0214504 A1* | 9/2006 | Kusano | 303/113.4 |
| 2008/0203812 A1* | 8/2008 | Niino et al. | 303/10 |

FOREIGN PATENT DOCUMENTS

| | | |
|---|---|---|
| GB | 2 216 967 A | 10/1989 |
| JP | A-1-293261 | 11/1989 |
| JP | A-2-274648 | 11/1990 |
| JP | A-9-58445 | 3/1997 |
| JP | A-2001-315629 | 11/2001 |
| JP | A-2002-104173 | 4/2002 |
| JP | A-2006-168412 | 6/2006 |
| WO | WO 97/39931 A1 | 10/1997 |
| WO | WO 2006/131369 A1 | 12/2006 |

OTHER PUBLICATIONS

International Search Report issued in International Application No, PCT/IB2009/000221 on May 6, 2009.

Written Opinion of the International Searching Authority issued in International Application No. PCT/IB2009/000221 on May 6, 2009.

Written Opinion of the International Preliminary Examining Authority issued in International Application No. PCT/IB2009/000221 on Apr. 6, 2010.

International Preliminary Report on Patentability issued in International Application No. PCT/IB2009/000221 on May 26, 2010.

Japanese Office Action issued in Japanese Patent Application No. JP-2008-031064 on Jan. 28, 2010 (with translation).

\* cited by examiner

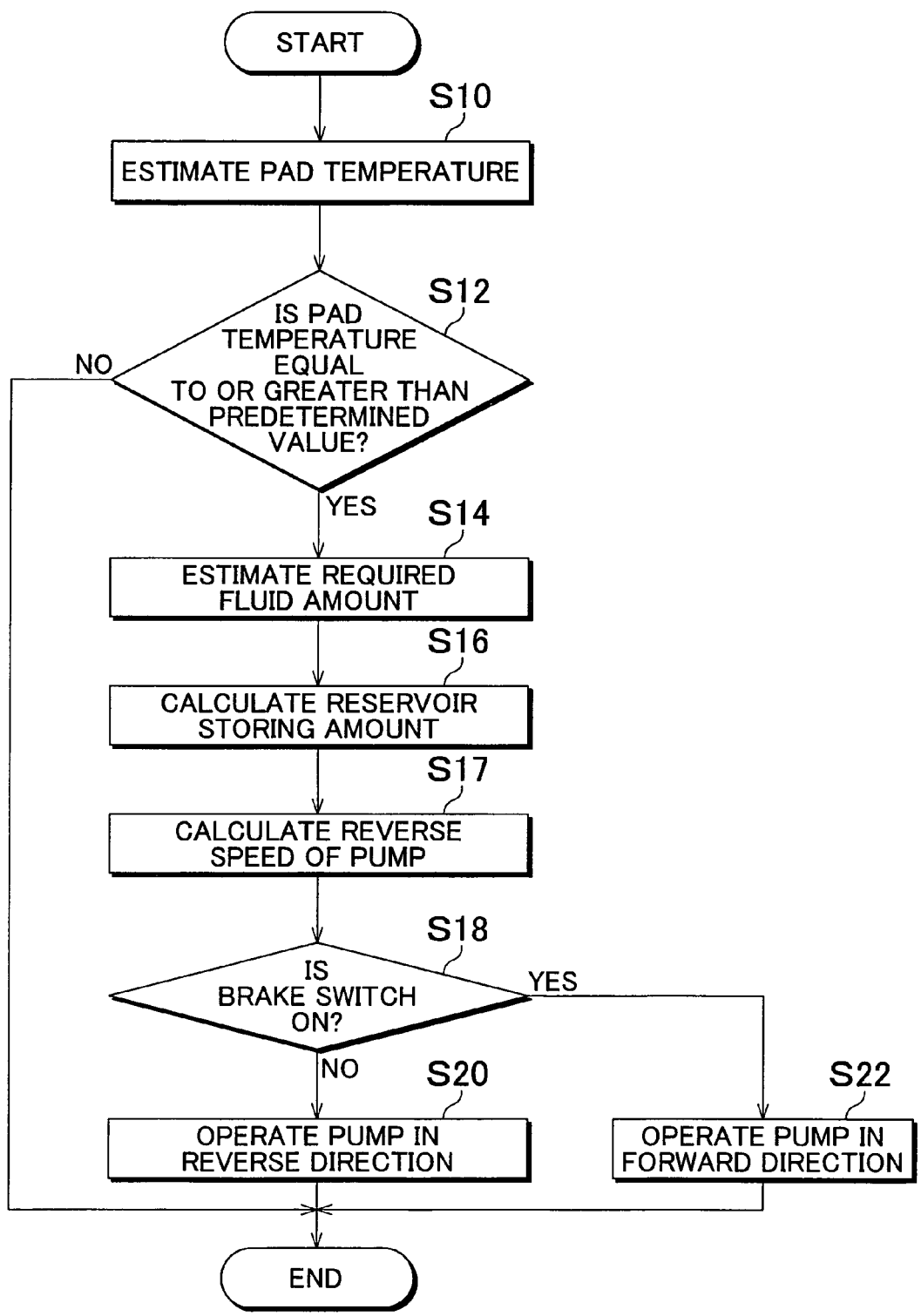

BRAKE CONTROL SYSTEM AND BRAKE CONTROL METHOD

BACKGROUND OF THE INVENTION

1. Field of the Invention

The invention relates to a brake control system and brake control method which controls braking force applied to a wheel of a vehicle.

2. Description of the Related Art

Japanese Patent Application Publication No. 9-58445 (JP-A-9-58445), for example, describes a brake control system which controls the braking force of a vehicle such as an automobile and is provided with a reservoir in a hydraulic circuit.

When an abnormality such as fading occurs in such a brake control system, the hydraulic pressure in the wheel cylinder is insufficient, reducing braking performance. In this case, it is desirable to drive a pump in the hydraulic circuit to increase the hydraulic pressure in the wheel cylinder to maintain the required braking force. However, in this case, if the pump starts to be driven while the driver is depressing the brake pedal, brake fluid will flow out of the master cylinder, creating a phenomenon in which the brake pedal is drawn or sucked in, which may adversely affect the pedal feel.

SUMMARY OF THE INVENTION

This invention thus provides a brake control system and brake control method capable of achieving good pedal feel.

A first aspect of the invention relates to a brake control system which includes a wheel cylinder, a brake operating member, an external reservoir, a master cylinder, an internal reservoir, a pump, and a pump control unit. The wheel cylinder applies braking force to a wheel according to hydraulic pressure generated by a supply of hydraulic fluid. The brake operating member is operated by a driver. The external reservoir is communicatively connected to the master cylinder and stores hydraulic fluid. The master cylinder generates hydraulic pressure according to an operating amount of the brake operating member. Communication between the master cylinder and the external reservoir is cut off when the operating amount of the brake operating member is equal to or greater than a predetermined value. The internal reservoir is communicatively connected to the master cylinder and stores hydraulic fluid. The pump selectively discharges hydraulic fluid in two directions, one being a direction that increases the hydraulic pressure in the wheel cylinder by drawing up hydraulic fluid from the internal reservoir, and the other being a direction that stores hydraulic fluid in the internal reservoir. The pump control unit controls the pump to discharge hydraulic fluid in the direction that stores hydraulic fluid in the internal reservoir when communication is open between the master cylinder and the external reservoir, and controls the pump to discharge hydraulic fluid in the direction that increases the hydraulic pressure in the wheel cylinder when the brake operating member is operated such that communication is cut off between the master cylinder and the external reservoir.

According to this aspect, the pump control unit drives the pump to discharge hydraulic fluid in the direction that stores hydraulic fluid in the internal reservoir when communication is open between the master cylinder and the external reservoir, and drives the pump to discharge hydraulic fluid in the direction which increases the hydraulic pressure in the wheel cylinder when the brake operating member is operated such that communication is cut off between the master cylinder and the external reservoir. As a result, when the brake operating member is operated, hydraulic pressure greater than the master cylinder pressure can be generated in the wheel cylinder, thereby ensuring braking force. Also, when the brake operating member is operated, a sufficient amount of hydraulic fluid is able to be supplied from within the internal reservoir to the wheel cylinder by driving the pump so hydraulic fluid can be inhibited from flowing out of the master cylinder due to the pump being driven. Accordingly, the phenomenon in which the brake operating member is drawn or sucked in can be suppressed, thus enabling good pedal feel to be obtained.

A braking force determining unit, which determines whether the braking force generated by the hydraulic pressure in the wheel cylinder that is obtained through only operation of the brake operating member is less than a target braking force, may also be provided. When it is determined that the braking force is less than the target braking force and communication is open between the master cylinder and the external reservoir, the pump control unit may also control the pump to discharge hydraulic fluid in the direction that stores hydraulic fluid in the internal reservoir.

In this case, the control described above may be performed only when the braking force generated by the hydraulic pressure in the wheel cylinder that is obtained through only operation of the brake operating member is less than a target braking force. The pump is not driven when the required braking force can be ensured by only the master cylinder pressure generated by operating the brake operating member. Therefore, unnecessary operation of the pump can be suppressed, which enables the durability of the pump and the internal reservoir to be improved.

According to the invention, a good pedal feel can be achieved. Incidentally, in the invention, determining the temperature of the brake pad includes both estimating the temperature of the brake pad and detecting the temperature of the brake pad.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a flowchart illustrating a fading brake control routine.

DETAILED DESCRIPTION OF THE PREFERRED EMBODIMENTS

Example embodiments of the present invention will be described in greater detail below with reference to the accompanying drawings.

Figure 1:
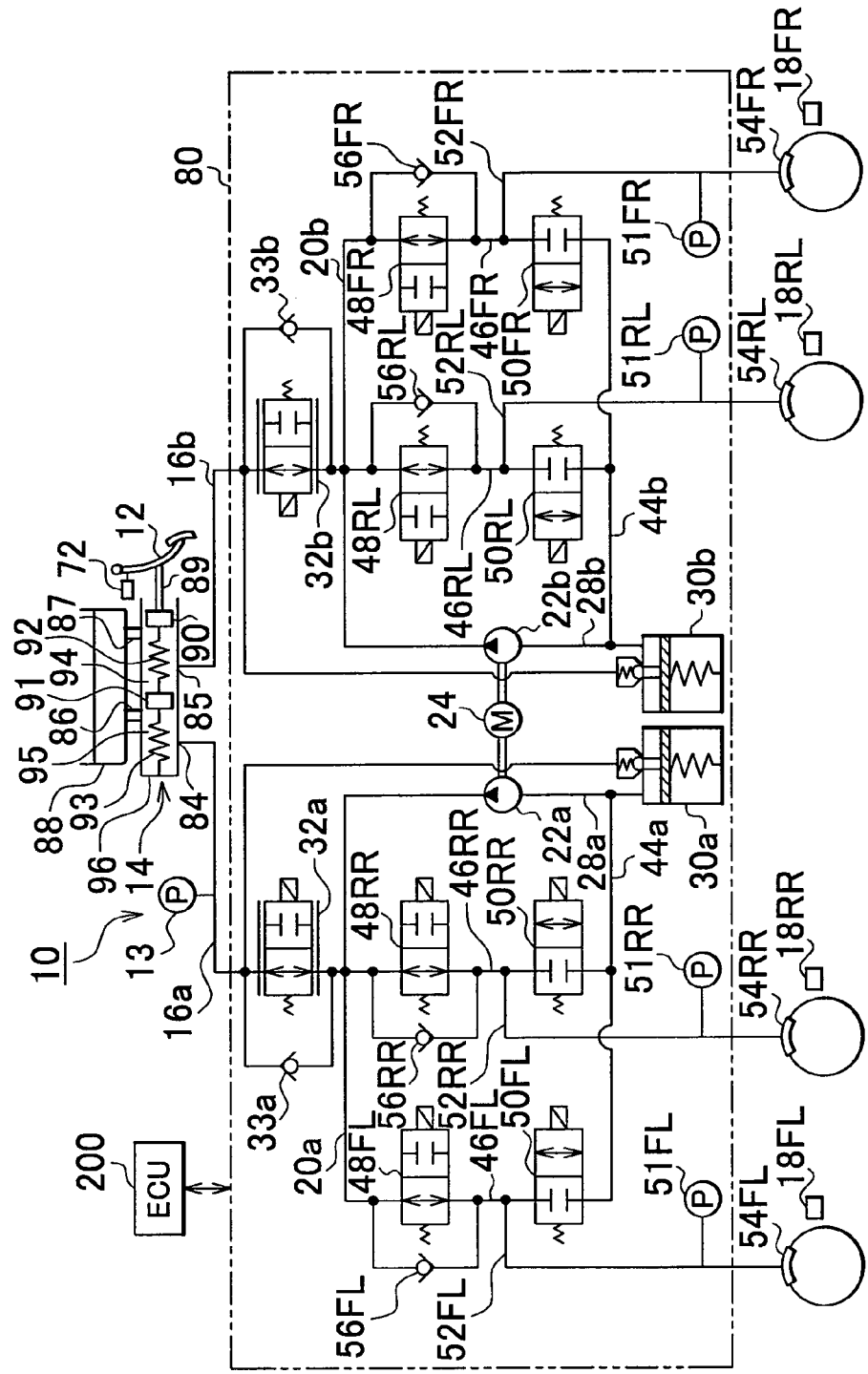
FIG. 1 is a diagram of the structure of a brake control system according to an example embodiment of the invention.

FIG. 1 is a diagram of the structure of a brake control system 10 according to an example embodiment of the invention. The hydraulic circuit in the brake control system 10 shown in FIG. 1 is configured as a diagonally split system in which a system for the left front wheel and the right rear wheel is independent of a system for the right front wheel and the left rear wheel. Therefore, if one of the systems was to fail, the other system would still be able to function reliably.

The brake control system 10 includes a master cylinder 14 that generates hydraulic pressure corresponding to the depression amount of a brake pedal 12, which serves as a brake operating member, by a driver. The master cylinder 14 has a first piston 90 slidably housed in a cylinder housing 96. A piston rod 89 that is connected to the brake pedal 12 is formed on one end of the first piston 90. The master cylinder 14 also has a second piston 91 which is also slidably housed in the cylinder housing 96. With the two pistons inserted in the cylinder housing 96, a first fluid chamber 94 is formed between the first piston 90 and the second piston 91, and a second fluid chamber 95 is formed between the second piston 91 and the bottom portion of the cylinder housing 96.

A first spring 92 is provided at a predetermined spring load between the first piston 90 and the second piston 91, and a second spring 93 is provided between the second piston 91 and the bottom portion of the cylinder housing 96.

A first input port 87 that leads to the first fluid chamber 94 and a second input port 86 that leads to the second fluid chamber 95 are formed in one side surface of the cylinder housing 96 of the master cylinder 14. The first input port 87 and the second input port 86 are both communicatively connected to a master cylinder reservoir 88 which is an external reservoir. The master cylinder reservoir 88 stores hydraulic fluid that is supplied to the first fluid chamber 94 and the second fluid chamber 95 of the master cylinder 14 via the first input port 87 and the second input port 86, respectively.

Also, a first output port 85 that leads from the first fluid chamber 94 and a second output port 84 that leads from the second fluid chamber 95 are formed in the another side surface of the cylinder housing 96 of the master cylinder 14. A brake pressure control line 16b for the right front wheel and the left rear wheel is connected to the first output port 85, and a brake pressure control line 16a for the left front wheel and the right rear wheel is connected to the second output port 84.

In the master cylinder 14 structured as described above, when the brake pedal 12 is depressed and the first piston 90 and the second piston 91 advance a predetermined value or more, couplings (not shown) provided on both the first piston 90 and the second piston 91 close off communication between the first fluid chamber 94 and the master cylinder reservoir 88 as well as between the second fluid chamber 95 and the master cylinder reservoir 88. As a result, master cylinder pressure corresponding to the operating amount (i.e., depression amount) of the brake pedal 12 is generated in the first fluid chamber 94 and the second fluid chamber 95 of the master cylinder 14, and hydraulic fluid is fed through the first output port 85 and the second output port 84.

The brake pedal 12 is provided with a brake switch 72 that turns on when the brake pedal is depressed. A brake booster, not shown, for generating a large amount of braking force by increasing the depression force applied by the driver may also be provided between the brake pedal 12 and the master cylinder 14.

Also, the brake control system 10 has two pumps 22a and 22b. One output portion of the pump 22a is connected to a high pressure line 20a, while the other output portion of the pump 22a is connected to a first port of an internal reservoir 30a via a supply line 28a. The high pressure line 20a is connected to the brake pressure control line 16a via a linear control valve 32a which will be described later. A second port of the internal reservoir 30a is connected to the brake pressure control line 16a. Similarly, one output portion of the pump 22b is connected to a high pressure line 20b, while the other output portion of the pump 22b is connected to a first port of an internal reservoir 30b via a supply line 28b. The high pressure line 20b is connected to the brake pressure control line 16b via a linear control valve 32b which will be described later. A second port of the internal reservoir 30b is connected to the brake pressure control line 16b.

The pump 22a can discharge hydraulic fluid in two directions, one being a direction that increases the hydraulic pressure in wheel cylinders 54FL and 54RR by drawing up hydraulic fluid from the internal reservoir 30a (hereinafter this direction will be referred to as the "pressure increase direction"), and the other being a direction that stores hydraulic fluid from the master cylinder 14 or the wheel cylinders 54FL and 54RR in the internal reservoir 30a (hereinafter this direction will be referred to as the "storing direction"). Similarly, the pump 22b can discharge hydraulic fluid in two directions, one being a direction that increases the hydraulic pressure in wheel cylinders 54FR and 54RL by drawing up hydraulic fluid from the internal reservoir 30b (hereinafter this direction will be referred to as the "pressure increase direction"), and the other being a direction that stores hydraulic fluid from the master cylinder 14 or the wheel cylinders 54FR and 54RL in the internal reservoir 30b (hereinafter this direction will be referred to as the "storing direction"). A gear pump is one example of such a pump capable of discharging fluid in two directions.

Incidentally, in the following description, the pumps 22a and 22b will collectively be referred to as "pumps 22" where appropriate, and the internal reservoirs 30a and 30b will collectively be referred to as "internal reservoirs 30" where appropriate. Also, the high pressure lines 20a and 20b will collectively be referred to as "high pressure lines 20" where appropriate, the brake pressure control line 16a and the brake pressure control line 16b will collectively be referred to as "brake pressure control lines 16" where appropriate, the linear control valves 32a and 32b will collectively be referred to as "linear control valves 32" where appropriate, and the wheel cylinders 54FL, 54RR, 54RL, and 54FR will collectively be referred to as "wheel cylinders 54" where appropriate.

The pumps 22 are driven by a motor 24. Driving the motor 24 in a predetermined first direction results in the pumps 22 being driven to discharge hydraulic fluid in the pressure increase direction (this operation of the pump 22 will be referred to as operation in the "forward direction"). Also, driving the motor 24 in a second direction which is opposite the first direction results in the pumps 22 being driven to discharge hydraulic fluid in the storing direction (this operation of the pumps 22 will be referred to as operation in the "reverse direction").

When operated in the forward direction, the pumps 22 draw up hydraulic fluid stored in the internal reservoirs 30 and discharge (i.e., supply) it to the high pressure lines 20. Also when operated in the reverse direction, the pumps 22 store hydraulic fluid from the master cylinder 14 or the wheel cylinders 54 in the internal reservoirs 30.

The linear control valve 32a and a check valve 33a are provided between the brake pressure control line 16a and the high pressure line 20a for the left front and right rear wheels. The linear control valve 32a is a normally open electromagnetic flow control valve which is open when de-energized. The opening amount of this linear control valve 32a can be adjusted as necessary. Adjusting the opening amount of the linear control valve 32a enables a differential pressure to be created between the hydraulic pressure in the brake pressure control line 16a and the hydraulic pressure in the high pressure line 20a, i.e., before and after the linear control valve 32a.

Similarly, the linear control valve 32*b* and a check valve 33*b* are provided between the brake pressure control line 16*b* and the high pressure line 20*b* for the right front and left rear wheels. The linear control valve 32*b* is a normally open electromagnetic flow control valve which is open when de-energized. The opening amount of this linear control valve 32*b* can be adjusted as necessary. Adjusting the opening amount of the linear control valve 32*b* enables a differential pressure to be created between the hydraulic pressure in the brake pressure control line 16*b* and the hydraulic pressure in the high pressure line 20*b*, i.e., before and after the linear control valve 32*b*.

A return line 44*a* for the left front and right rear wheels is connected to the supply line 28*a* for the left front and right rear wheels. A left front wheel connecting line 46FL and a right rear wheel connecting line 46RR connect the return line 44*a* to the high pressure line 20*a*. A pressure increase valve 48FL, which is a normally open solenoid valve, and a pressure decrease valve 50FL, which is a normally closed solenoid valve, are provided in the connecting line 46FL. Similarly, a pressure increase valve 48RR, which is a normally open solenoid valve, and a pressure decrease valve 50RR, which is a normally closed solenoid valve, are provided in the connecting line 46RR.

The connecting line 46FL between the pressure increase valve 48FL and the pressure decrease valve 50FL is connected to the left front-wheel wheel cylinder 54FL via a connecting line 52FL. A check valve 56FL which allows hydraulic fluid to flow only in the direction from the wheel cylinder 54FL to the high pressure line 20*a* is provided between the connecting line 52FL and the high pressure line 20*a*.

Similarly, the connecting line 46RR between the pressure increase valve 48RR and the pressure decrease valve 50RR is connected to the right rear-wheel wheel cylinder 54RR via a connecting line 52RR. A check valve 56RR which allows hydraulic fluid to flow only in the direction from the wheel cylinder 54RR to the high pressure line 20*a* is provided between the connecting line 52RR and the high pressure line 20*a*.

Similar to the left front and right rear wheel side, a return line 44*b* for the right front and left rear wheels is connected to the supply line 28*b* for the right front and left rear wheels. A left rear wheel connecting line 46RL and a right front wheel connecting line 46FR connect the return line 44*b* to the high pressure line 20*b*. A pressure increase valve 48RL, which is a normally open solenoid valve, and a pressure decrease valve 50RL, which is a normally closed solenoid valve, are provided in the connecting line 46RL. Similarly, a pressure increase valve 48FR, which is a normally open solenoid valve, and a pressure decrease valve 50FR, which is a normally closed solenoid valve, are provided in the connecting line 46FR.

The connecting line 46RL between the pressure increase valve 48RL and the pressure decrease valve 50RL is connected to the left rear-wheel wheel cylinder 54RL via a connecting line 52RL. A check valve 56RL which allows hydraulic fluid to flow only in the direction from the wheel cylinder 54RL to the high pressure line 20*b* is provided between the connecting line 52RL and the high pressure line 20*b*. Similarly, the connecting line 46FR between the pressure increase valve 48FR and the pressure decrease valve 50FR is connected to the right front-wheel wheel cylinder 54FR via a connecting line 52FR. A check valve 56FR which allows hydraulic fluid to flow only in the direction from the wheel cylinder 54FR to the high pressure line 20*b* is provided between the connecting line 52FR and the high pressure line 20*b*. Incidentally, the brake pressure control lines 16, the high pressure lines 20, the connecting lines 46, and the connecting lines 52 may be regarded as a first communicating path, and the high pressure lines 20, the supply line 28*a*, the supply line 28*b* and the return lines 44 may be regarded as a second communicating path. In this case, when communication is open between the master cylinder 14 and the master cylinder reservoir 88, the hydraulic fluid is discharged from at least the master cylinder 14 and the master cylinder reservoir 88 to the internal reservoirs 30 through the first communicating path and the second communicating path by operating the pumps 22 in the reverse direction. Thus, the hydraulic fluid is stored in the internal reservoirs 30. When the brake pedal 12 is operated such that communication is cut off between the master cylinder 14 and the master cylinder reservoir 88, the pumps 22 draw up the hydraulic fluid stored in the internal reservoirs 30 and discharge the hydraulic fluid to the wheel cylinder 54 side through the first communicating path and the second communicating path by operating the pumps 22 in the forward direction. Thus, the hydraulic pressure in the wheel cylinder 54 increases.

Incidentally, in the following description, the pressure increase valves 48FL, 48RR, 48RL, and 48FR will collectively be referred to as "pressure increase valves 48", and the pressure decrease valves 50FL, 50RR, 50RL, and 50FR will collectively be referred to as "pressure decrease valves 50". Also, the return lines 44*a* and 44*b* will collectively be referred to as "return lines 44", and the connecting lines 52FL, 52RR, 52RL, and 52FR will collectively be referred to as "connecting lines 52" where appropriate.

Although not shown, a disc brake unit, which generates braking force by pushing a brake pad against a disc through operation of the wheel cylinders 54, is provided for each wheel of the vehicle.

A left front-wheel wheel cylinder pressure sensor 51FL is provided near the left front-wheel wheel cylinder 54FL, a right rear-wheel wheel cylinder pressure sensor 51RR is provided near the right rear-wheel wheel cylinder 54RR, a left rear-wheel wheel cylinder pressure sensor 51RL is provided near the left rear-wheel wheel cylinder 54RL, and a right front-wheel wheel cylinder pressure sensor 51FR is provided near the right front-wheel wheel cylinder 54FR. Each of these wheel cylinder pressure sensors 51FL, 51RR, 51RL, and 51FR detects the wheel cylinder pressure in the wheel cylinder 54 near which it is provided. Hereinafter, these wheel cylinder pressure sensors 51FL to 51FR will collectively be referred to as "wheel cylinder pressure sensors 51" where appropriate.

Also, a left front-wheel wheel speed sensor 18FL is provided on the left front wheel, a right rear-wheel wheel speed sensor 18RR is provided on the right rear wheel, a left rear-wheel wheel speed sensor 18RL is provided on the left rear wheel, and a right front-wheel wheel speed sensor 18FR is provided on the right front wheel. Each of these wheel speed sensors 18FL, 18RR, 18RL, and 18FR detects the wheel speed of the wheel on which it is provided. Hereinafter, these wheel speed sensors 18FL, 18RR, 18RL, and 18FR will collectively be referred to as "wheel speed sensors 18" where appropriate.

The linear control valves 32, the pressure increase valves 48, the pressure decrease valves 50, and the pumps 22 and the like together form a hydraulic actuator 80 of the brake control system 10. This hydraulic actuator 80 is controlled by an electronic control unit (hereinafter referred to as "ECU") 200.

This ECU 200 includes a CPU that executes various calculations, ROM in which various control programs are stored, RAM which is used as a work area for executing programs and storing data, nonvolatile memory such as backup RAM that is able to retain stored information even when the engine is shut off, an input/output interface, an A/D converter for converting analog signals received from various sensors and the like into digital signals, and a timer for timing, and the like.

Various actuators, including the hydraulic actuator 80 with the linear control valves 32, the pressure increase valves 48, the pressure decrease valves 50, and the motors 24 and the like described above, are electrically connected to the ECU 200.

Also, various sensors and switches which output signals used in control are also electrically connected to the ECU 200. That is, the ECU 200 receives signals indicative of the wheel cylinder pressure in the wheel cylinders 54 from the wheel cylinder pressure sensors 51.

The ECU 200 also receives signals indicative of the wheel speed of the wheels from the wheel speed sensors 18, a signal indicative of the yaw rate from a yaw rate sensor, a signal indicative of the steering angle of a steering wheel from a steering angle sensor, and a signal indicative of the running speed of the vehicle from a vehicle speed sensor.

In addition, the ECU 200 receives a signal indicative of the master cylinder pressure from a master cylinder pressure sensor 13, and a signal indicative of whether the brake switch 72 is on from the brake switch 72. The ECU 200 also receives a signal from a sensor, not shown, that detects the high pressure line pressure, and calculates a differential pressure P before and after the linear control valves 32 from the master cylinder pressure and the high pressure line pressure.

In the brake control system 10 structured as described above, when the vehicle is running normally, the linear control valves 32 and the pressure increase valves 48 are open, and the pressure decrease valves 50 are closed such that when the driver depresses the brake pedal 12, hydraulic pressure equal to the master cylinder pressure that is generated at that time is generated in the wheel cylinders, thereby generating braking force.

Also, the brake control system 10 also monitors the running state of the vehicle based on the signals from the various sensors connected to the ECU 200, and automatically generates the optimum braking force by controlling the pumps 22 and the linear control valves 32 according to the running state of the vehicle. Examples of this kind of automatic brake control include Traction Control (TRC) and Vehicle Stability Control (VSC), but as these are already known, descriptions thereof will be omitted.

One automatic brake control able to be performed by the brake control system 10 according to this example embodiment is Fading Brake Control (FBC). The fading brake control described here refers to control that is performed when the brakes are fading. When the brakes are fading, the amount of hydraulic fluid supplied to the wheel cylinders 54 when the driver depresses the brake pedal 12 as usual may no longer be sufficient to generate sufficient braking force. Therefore, with the fading brake control in this example embodiment, when the brakes are fading, the hydraulic pressure in the high pressure lines 20 is adjusted to ensure the required braking force by driving the pumps 22 and controlling the open/closed state of the linear control valves 32.

Figure 2:
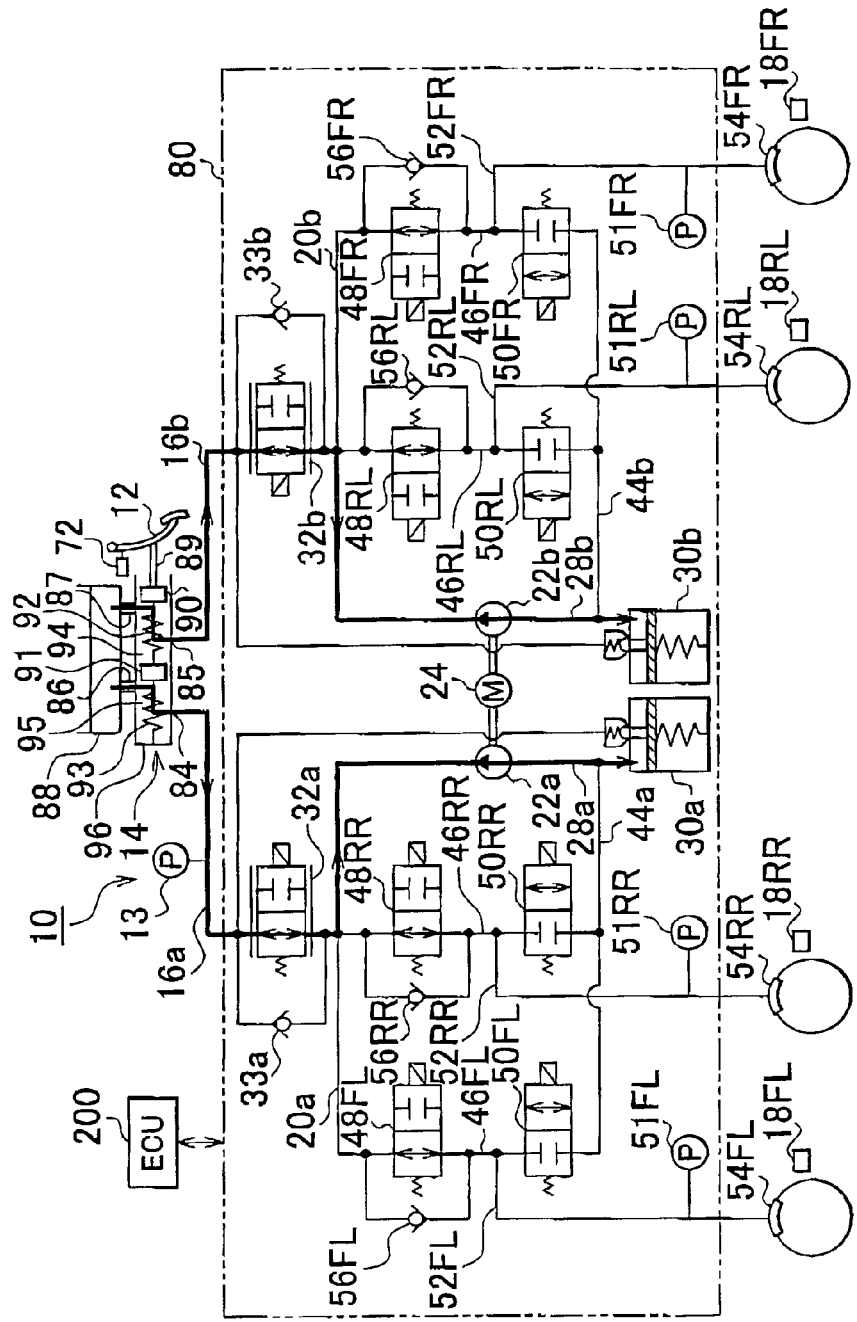
FIG. 2 is a diagram illustrating fading brake control.
Figure 3:
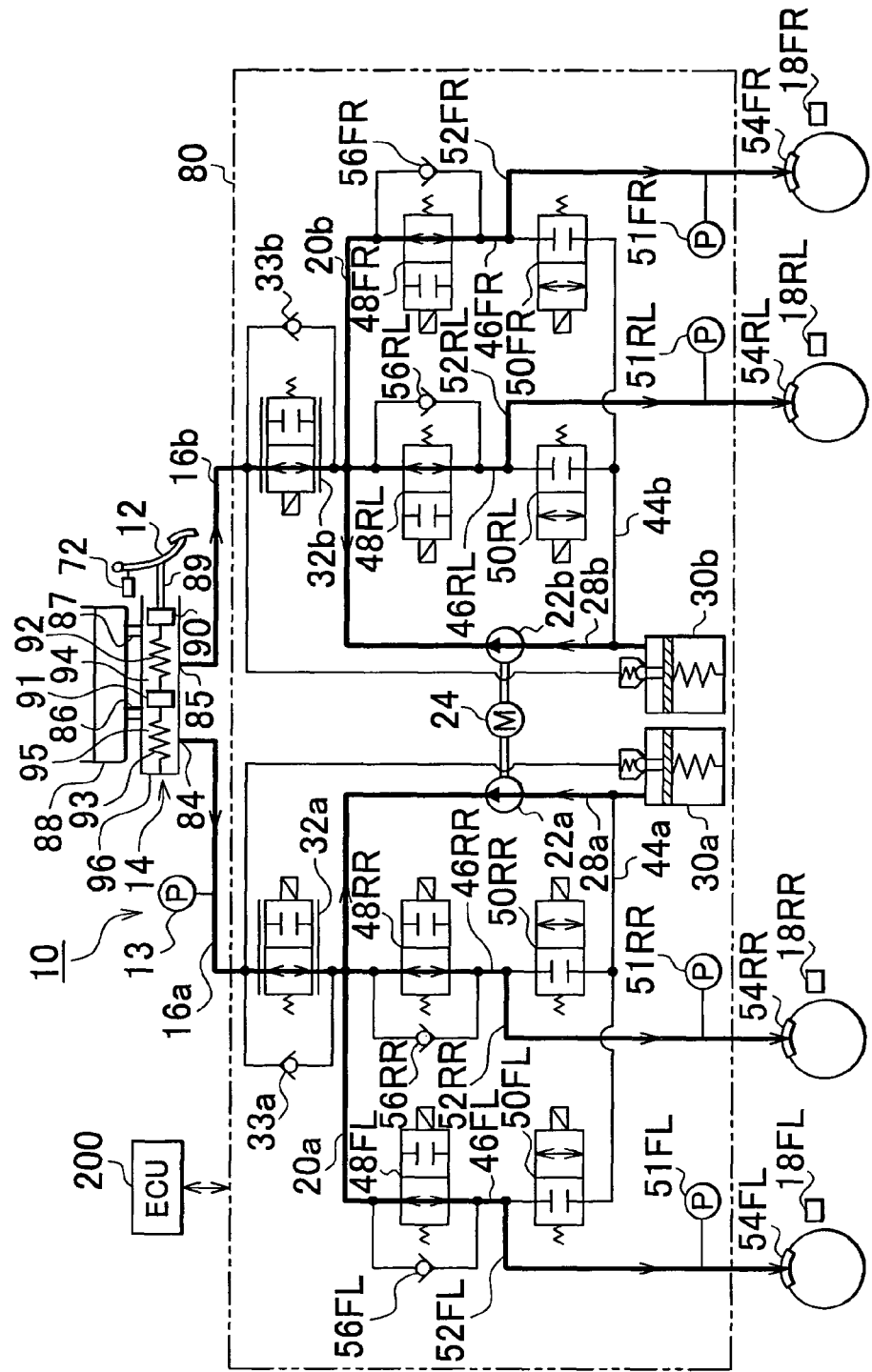
FIG. 3 is another diagram illustrating fading brake control.

FIGS. 2 and 3 are diagrams illustrating this fading brake control. FIG. 2 is a diagram showing the state of the brake control system 10 when the driver is not depressing the brake pedal 12, and FIG. 3 is a diagram showing the state of the brake control system 10 when the driver is depressing the brake pedal 12. When the brake pedal 12 is not being depressed, communication is open between the first fluid chamber 94 and the second fluid chamber 95 of the master cylinder 14, and the master cylinder reservoir 88. When the brake pedal 12 is depressed and the first and second pistons 90 and 91 advance a predetermined value or more, the first fluid chamber 94 and the second fluid chamber 95 become closed off from the master cylinder reservoir 88, as described above.

In the brake control system 10 according to this example embodiment, the ECU 200 functions as a braking force determining unit which determines whether the braking force generated by the hydraulic pressure in the wheel cylinder that is obtained through only operation of the brake operating member is less than a target braking force. The ECU 200 calculates the workload from i) the friction force generated between the brake discs and the brake pads and ii) the amount of rotation of the discs, and estimates the pad temperature from that workload and a brake pad cooling model. The ECU 200 determines that the brakes are fading based on the estimated pad temperature, e.g., when the pad temperature is equal to or higher than a predetermined value.

Then the ECU 200 estimates, according to the pad temperature, the amount of hydraulic fluid required by the wheel cylinders 54 in order to ensure a predetermined braking force, and calculates the reservoir storing amount, which is the amount of hydraulic fluid to be stored in the internal reservoirs 30, based on that estimated amount of hydraulic fluid. In this example embodiment, the amounts of hydraulic fluid required for the wheel cylinder 54FL and the wheel cylinder 54RR are estimated and the sum of those amounts is the reservoir storing amount to be stored in the internal reservoir 30*a*. Also, the amounts of hydraulic fluid required by the wheel cylinder 54RL and the wheel cylinder 54FR are estimated and the sum of those amounts is the reservoir storing amount to be stored in the internal reservoir 30*b*.

The ECU 200 calculates the reverse speed of the pumps 22 necessary to obtain the calculated reservoir storing amounts. Then the ECU 200 outputs a drive command to the motor 24 to operate the pumps 22 in the reverse direction at that reverse speed when the brake pedal 12 is not being depressed such that communication is open between the first fluid chamber 94 and the second fluid chamber 95 of the master cylinder 14, and the master cylinder reservoir 88. Depression of the brake pedal 12 (i.e., whether the brake pedal 12 is being depressed) is detected by the brake switch 72. Accordingly, the pumps 22 are driven in the reverse direction such that hydraulic fluid of an amount equal to the reservoir storing amount flows out of the master cylinder reservoir 88 through the first input port 87 and the second input port 86, and then through the master cylinder 14, the brake pressure control lines 16, the linear control valves 32, and the high pressure lines 20 to be stored in the internal reservoirs 30, as shown by the bold arrows in the hydraulic circuit in FIG. 2. Alternatively, the pumps 22 are driven in the reverse direction so that hydraulic fluid flows from the wheel cylinders 54 through the connecting lines 52, the pressure decrease valves 50, and the return lines 44 and is stored in the internal reservoirs 30.

When the driver depresses the brake pedal 12 such that the first fluid chamber 94 and the second fluid chamber 95 of the master cylinder 14 become closed off from the master cylinder reservoir 88, the ECU 200 outputs a drive command to the motor 24 to drive the pumps 22 in the forward direction in order to discharge hydraulic fluid in the pressure increase direction of the wheel cylinders 54. As a result, the hydraulic fluid stored in the internal reservoirs 30 is drawn up by the pumps 22 and supplied, together with the hydraulic fluid from the master cylinder 14 by the driver depressing the brake pedal 12, to the wheel cylinders 54, as shown by the bold arrow in FIG. 3, such that braking force is generated. The hydraulic pressure in the wheel cylinders 54 can be controlled to obtain appropriate braking force by adjusting the opening amounts of the linear control valves 32.

In this way, with the brake control system 10 according to this example embodiment, when it is determined that the brakes are fading and the brake pedal 12 is not being depressed, hydraulic fluid is stored in the internal reservoirs 30 by driving the pumps 22 to discharge hydraulic fluid in the storing direction such that communication is open between the master cylinder reservoir 88 and the master cylinder 14. Then when the brake pedal 12 is depressed when the brakes are fading, the pumps 22 are driven to discharge the hydraulic fluid stored in the internal reservoirs 30 in the pressure increase direction of the wheel cylinders 54. Accordingly, sufficient braking force can be ensured even if the brakes are fading.

In the brake control system according to this example embodiment, the pumps 22 supply hydraulic fluid from the master cylinder reservoir 88 to the internal reservoirs 30 when the brake pedal 12 is not being operated, and draw up hydraulic fluid from the internal reservoirs 30 when the brake pedal 12 is depressed to increase the wheel cylinder pressure. Accordingly, a sufficient amount of hydraulic fluid is able to be supplied from the internal reservoirs 30 to the wheel cylinders 54 when the brake pedal 12 is depressed so hydraulic fluid can be inhibited from flowing out of the master cylinder 14 even when the pumps 22 are being driven. As a result, the phenomenon in which the brake pedal 12 is drawn or sucked in can be suppressed, thus improving the pedal feel.

Also, in this example embodiment, the brake control system 10 is designed to detect when the brakes are fading and perform the fading brake control described above when they are. However, the pumps 22 are not driven when the required braking force is able to be obtained by only the master cylinder pressure that is generated by the driver depressing the brake pedal 12. Accordingly, unnecessary operation of the pumps 22 is suppressed so the durability of the pumps 22 and the internal reservoirs 30 can be improved.

FIG. 4 is a flowchart illustrating a fading brake control routine. This control routine is continuously executed at predetermined intervals of time.

First, the ECU 200 calculates the workload from the friction force generated between the brake discs and the brake pads, and the rotation amount of the discs, and then estimates the pad temperature from that workload and a brake pad cooling model (step S10).

Then the ECU 200 determines whether the estimated pad temperature is equal to or greater than a predetermined value (step S12). If the pad temperature is equal to or greater than the predetermined value (i.e., Y in step S12), the ECU 200 determines that the brakes are fading and estimates the amount of hydraulic fluid required for the wheel cylinders 54 to ensure a predetermined braking force (step S14). On the other hand, if the pad temperature is less than the predetermined value (i.e., N in step S12), this cycle of the routine ends.

After step S14, the ECU 200 calculates a reservoir storing amount of hydraulic fluid to be stored in the internal reservoirs 30 based on the estimated amount of required hydraulic fluid (step S16). Then the ECU 200 calculates the reverse speed of the pumps 22 required to achieve the calculated reservoir storing amount (step S17).

Next, the ECU 200 determines whether the brake switch 72 is on (step S18). If it is determined that the brake switch 72 is off (i.e., NO in step S18), the ECU 200 outputs a command to the motor 24 to drive the pumps 22 in the reverse direction at the calculated reverse speed (step S20). As a result, hydraulic fluid of an amount equal to the reservoir storing amount flows out of the master cylinder reservoir 88 through the first input port 87 and the second input port 86, and then through the master cylinder 14, the brake pressure control lines 16, the linear control valves 32, and the high pressure lines 20 to be stored the internal reservoirs 30, as shown by the bold arrows in the hydraulic circuit in FIG. 2.

On the other hand, if the driver is depressing the brake pedal 12 such that it is determined in step S18 that the brake switch 72 is on (i.e., Y in step S18), the ECU 200 outputs a signal to the motor 24 to drive the pumps 22 in the forward direction (step S22). As a result, the pumps 22 draw up the hydraulic fluid stored in the internal reservoirs 30 and supply that hydraulic fluid, together with the hydraulic fluid from the master cylinder 14 from the driver depressing the brake pedal 12, to the wheel cylinders 54, as shown by the bold arrow in FIG. 3, such that braking force can be generated.

While the invention has been described with reference, to example embodiments thereof, it is to be understood that the invention is not limited to the example embodiments or constructions. Various modified examples with various combinations of the constituent elements and processes will readily occur to those skilled in the art, and it is to be understood that all such modified examples are also included within the intended scope of the invention.

For example, the foregoing example embodiment describes control to be performed when the brakes are fading. Alternatively, however, the condition of the road surface may be detected and the pumps 22 may be driven in the reverse direction that stores hydraulic fluid in the internal reservoirs 30 when the brake pedal 12 is not being depressed and the road surface has a low μ. On a low μ road surface, sufficient braking force (i.e., the target braking force) may not be able to be generated by only the master cylinder pressure generated by depressing the brake pedal 12. However, storing hydraulic fluid in the internal reservoirs 30 by operating the pumps 22 in the reverse direction when the brake pedal 12 is not being depressed and then supplying the hydraulic fluid stored in the internal reservoir 30 to the wheel cylinders 54 by operating the pumps 22 in the forward direction when the brake pedal 12 is being depressed enables the required braking force to be ensured while achieving a good pedal feel.

What is claimed is:

1. A brake control system comprising:
a wheel cylinder that applies braking force to a wheel according to hydraulic pressure generated by a supply of hydraulic fluid;
a brake operating member operated by a driver;
an external reservoir in which hydraulic fluid is stored;
a master cylinder which generates hydraulic master cylinder pressure according to an operating amount of the brake operating member, communication between the master cylinder and the external reservoir being cut off when the operating amount of the brake operating member is equal to or greater than a predetermined value;
an internal reservoir which is communicatively connected to the master cylinder and in which hydraulic fluid is stored;
a pump which selectively discharges hydraulic fluid in two directions, one being a direction that increases the hydraulic pressure in the wheel cylinder by drawing up hydraulic fluid from the internal reservoir, and the other being a direction that stores hydraulic fluid in the internal reservoir; and
a pump control unit which controls the pump to discharge hydraulic fluid in the direction that stores hydraulic fluid in the internal reservoir when communication is open between the master cylinder and the external reservoir, and controls the pump to discharge hydraulic fluid in the direction that increases the hydraulic pressure in the wheel cylinder when the brake operating member is operated such that communication is cut off between the master cylinder and the external reservoir and when a sufficient braking force is not able to be generated by only the master cylinder pressure.

2. The brake control system according to claim 1, further comprising:
a first communicating path that communicates the wheel cylinder with the master cylinder; and
a second communicating path that communicates the first communicating path with the internal reservoir,
wherein the pump is provided in the second communicating path.

3. The brake control system according to claim 1, further comprising:
a braking force determining unit which determines whether the braking force generated by the hydraulic pressure in the wheel cylinder that is obtained through only operation of the brake operating member is less than a target braking force,
wherein when it is determined that the braking force is less than the target braking force and communication is open between the master cylinder and the external reservoir, the pump control unit controls the pump to discharge hydraulic fluid in the direction that stores hydraulic fluid in the internal reservoir.

4. The brake control system according to claim 3, wherein the braking force determining unit determines that a brake is fading when the braking force is less than the target braking force.

5. The brake control system according to claim 3, further comprising:
a temperature determining unit which determines a temperature of a pad of the brake; and
an estimating unit which estimates an insufficient amount of hydraulic fluid in the wheel cylinder based on the determined temperature of the pad,
wherein the pump control unit controls the pump to discharge an amount of hydraulic fluid based on the estimated insufficient amount of hydraulic fluid in the direction that stores hydraulic fluid in the internal reservoir.

6. The brake control system according to claim 5, further comprising:
a calculating unit that calculates a reservoir storing amount of hydraulic fluid to be stored in the internal reservoir based on the estimated insufficient amount of hydraulic fluid,
wherein the pump control unit controls the pump to discharge an amount of hydraulic fluid based on the calculated reservoir storing amount in the direction that stores hydraulic fluid in the internal reservoir.

7. The brake control system according to claim 3, wherein the braking force determining unit determines that a road surface has a low μ when the braking force is less than the target braking force.

8. A brake control method comprising:
determining whether an operating amount of a brake operating member is equal to or greater than a predetermined value;
opening communication between an external reservoir in which hydraulic fluid is stored and a master cylinder that generates hydraulic master cylinder pressure according to the operating amount of the brake operating member in a wheel cylinder that applies a target braking force, when the operating amount of the brake operating member is less than the predetermined value;
cutting off communication between the external reservoir and the master cylinder when the operating amount of the brake operating member is equal to or greater than the predetermined value;
supplying hydraulic fluid from the external reservoir in a direction that stores hydraulic fluid in an internal reservoir which is communicatively connected to the master cylinder when communication is open between the external reservoir and the master cylinder; and
supplying hydraulic fluid in a direction that increases the hydraulic pressure in the wheel cylinder by drawing up hydraulic fluid from the internal reservoir when communication is cut off between the external reservoir and the master cylinder and when a sufficient braking force is not able to be generated by only the master cylinder pressure.

9. The brake control method according to claim 8, further comprising:
determining whether the braking force generated by the hydraulic pressure in the wheel cylinder that is obtained through only operation of the brake operating member is less than a target braking force;
wherein, supplying hydraulic fluid from the external reservoir in the direction that stores hydraulic fluid in the internal reservoir when it is determined that the braking force is less than the target braking force and communication is open between the external reservoir and the master cylinder.

10. The brake control method according to claim 9, wherein it is determined that a brake is fading when the braking force is less than the target braking force.

11. The brake control method according to claim 9, further comprising:
determining a temperature of a pad of the brake;
estimating an insufficient amount of hydraulic fluid in the wheel cylinder based on the determined temperature of the pad; and
controlling the amount of hydraulic fluid supplied from the external reservoir in the direction that stores hydraulic fluid in the internal reservoir based on the estimated insufficient amount of hydraulic fluid.

12. The brake control method according to claim 11, wherein an amount of hydraulic fluid to be stored in the internal reservoir is calculated based on the estimated insufficient amount of hydraulic fluid; and
the amount of hydraulic fluid supplied from the external reservoir in the direction that stores hydraulic fluid in the internal reservoir is controlled based on the calculated reservoir storing amount.

13. The brake control method according to claim 9, wherein a road surface is determined to have a low μ when the braking force is less than the target braking force.

* * * * *